US012132858B2

(12) United States Patent
Ramadhane et al.

(10) Patent No.: US 12,132,858 B2
(45) Date of Patent: Oct. 29, 2024

(54) REAL TIME AUDIO STREAM VALIDATION

(71) Applicant: International Business Machines Corporation, Armonk, NY (US)

(72) Inventors: Mohamed Zouhaier Ramadhane, Mexico City (MX); Cesar Augusto Rodriguez Bravo, San Rafael de Alajuela (CR); Ana Vialeny Mota Gómez, Morelos (MX); Desilda Toska, San Rafael (CR)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 17/454,495

(22) Filed: Nov. 11, 2021

(65) Prior Publication Data
US 2023/0141773 A1 May 11, 2023

(51) Int. Cl.
*H04M 3/22* (2006.01)
*H04L 9/32* (2006.01)

(52) U.S. Cl.
CPC ........ *H04M 3/2281* (2013.01); *H04L 9/3236* (2013.01)

(58) Field of Classification Search
CPC .......................... H04L 9/3236; H04M 3/2281
See application file for complete search history.

(56) References Cited

U.S. PATENT DOCUMENTS

| 8,812,319 | B2 | 8/2014 | Skerpac |
| 9,674,163 | B1 | 6/2017 | Feudo et al. |
| 10,136,098 | B2 | 11/2018 | Altenburger et al. |
| 10,291,646 | B2 | 5/2019 | Stolarz et al. |
| 10,546,590 | B2 | 1/2020 | Sharma et al. |
| 10,574,692 | B2 | 2/2020 | Drake |
| 11,032,415 | B1* | 6/2021 | Retnamma ............... G06F 21/64 |
| 2003/0041242 | A1* | 2/2003 | Patel ..................... H04L 9/3242 713/170 |
| 2011/0211682 | A1 | 9/2011 | Singh et al. |
| 2015/0373032 | A1* | 12/2015 | Stevens ............... H04M 3/4365 713/176 |
| 2016/0366115 | A1* | 12/2016 | Khalid ................ H04L 63/0471 |
| 2019/0158535 | A1 | 5/2019 | Kedem et al. |
| 2020/0351095 | A1* | 11/2020 | Yadav ................... H04L 9/3239 |

(Continued)

FOREIGN PATENT DOCUMENTS

| CN | 102223431 A | 10/2011 |
| KR | 101253225 B1 | 4/2013 |

OTHER PUBLICATIONS

Renza et al., "Robust Speech Hashing for Digital Audio Forensics," Applied Sciences, 10(1):249, Dec. 2019, 16 pages. https://pdfs.semanticscholar.org/df3f/f391126de5a3991d004c912ff946f8a5510d.pdf.

(Continued)

*Primary Examiner* — Barry W Taylor
(74) *Attorney, Agent, or Firm* — Yee & Associates, P.C.

(57) ABSTRACT

Real time audio stream validation is provided. An audio stream of a voice communication corresponding to a call is segmented into a plurality of blocks in response to receiving the audio stream from a user. The plurality of blocks is modified to generate a first modified audio stream corresponding to the call that includes hashed values of the plurality of blocks. The first modified audio stream along with the hashed values of the plurality of blocks is sent via a network.

17 Claims, 8 Drawing Sheets

(56) References Cited

U.S. PATENT DOCUMENTS

2023/0403144 A1* 12/2023 Rhodin ................ H04L 9/3239

OTHER PUBLICATIONS

"AAC Audio Validation," Jongbel Media Solutions 2021, accessed Jun. 8, 2021, 6 pages. https://www.jongbel.com/automated-validation/aac-audio-validation/.

Song et al., "iVisher: Real-Time Detection of Caller ID Spoofing," ETRI Journal, vol. 36, No. 5, Oct. 2014, 11 pages.

Deng et al., "CEIVE: Combating Caller ID Spoofing on 4G Mobile Phones Via Callee-Only Inference and Verification," MobiCom '18: Proceedings of the 24th Annual International Conference on Mobile Computing and Networking, Oct. 2018, New Delhi, India, pp. 369-384.

"Fake Caller ID Schemes: Information on Federal Agencies' Efforts to Enforce Laws, Educate the Public, and Support Technical Initiatives," GAO-20-153, Dec. 2019, 57 pages. https://www.gao.gov/assets/gao-20-153.pdf.

Kok, "Truecaller Insights: Top 20 Countries Affected By Spam Calls & Sms In 2019," Dec. 3, 2019, accessed Nov. 8, 2021; 18 pages. https://truecaller.blog/2019/12/03/truecaller-insights-top-20-countries-affected-by-spam-calls-sms-in-2019/.

Abdulrazzaq et al., "A Novel Steganography Approach for Audio Files," SN Computer Science 1, Article 97, 2020, 13 pages. https://link.springer.com/content/pdf/10.1007/s42979-020-0080-2.pdf.

Balgurgi et al., "Audio Steganography Used for Secure Data Transmission," Proceedings of International Conference on Advances in Computing, pp. 699-706. Abstract Only.

"The Aphex Face," bastwood, accessed Nov. 8, 2021, 4 pages. http://www.bastwood.com/?page_id=10.

Johnson, "Scammers can fake caller ID info," May 4, 2016, Federal Trade Commission Consumer Information, accessed Nov. 8, 2021, 1 page. https://www.consumer.ftc.gov/blog/2016/05/scammers-can-fake-caller-id-info.

"Enterprise-grade encrypted voice, video, and messaging with Silent Phone," Secure Enterprise Communication Solutions, Silent Circle 2021, accessed Nov. 8, 2021, 6 pages. https://www.silentcircle.com/.

Cook, "35+ Phone Spam Statistics for 2017—2021," Comparitech Limited, Jun. 22, 2021, accessed Nov. 11, 21, 6 pages. https://www.comparitech.com/blog/information-security/phone-spam-statistics/.

Miranda, "Scammers are using COVID-19 messages to scam people," Federal Trade Commission, Consumer Information, Apr. 10, 2020, accessed Nov. 11, 21, 2 pages. https://www.consumer.ftc.gov/blog/2020/04/scammers-are-using-covid-19-messages-scam-people.

* cited by examiner

REAL TIME AUDIO STREAM VALIDATION

BACKGROUND

1. Field

The disclosure relates generally to telephony and more specifically to validating that an audio stream of a voice communication corresponding to a call is authentic from a trusted source and has not been tampered with by verifying a hashed value of each respective block in a series of blocks comprising the audio stream.

2. Description of the Related Art

Telephony is the use and operation of devices, such as, for example, mobile phones, for transmission of voice communications between distant parties. Phone scams are increasing and have become more sophisticated over time, with new technologies and relative lack of regulatory protection of mobile phone numbers as compared to landline telephone numbers. It has been reported that over 40 percent of all calls are some type of scam call. Scam phone numbers are one of the most common forms of scam calls, as scam operations will use spoofing technology to generate a false phone number that a recipient of a scam call might trust. For example, a large percentage of scam callers utilize neighborhood spoofing that tricks caller ID to show area codes and telephone numbers local to recipients of these scam calls. By imitating local numbers, it makes a scam call appear legitimate, which tricks recipients into answering the call. This strategy increases the odds that scam callers will successfully get recipients to divulge sensitive information, such as, for example, banking information and the like. Scam calls have cost some recipients thousands of dollars.

SUMMARY

According to one illustrative embodiment, a computer-implemented method for real time audio stream validation is provided. A first voice communication device sends an audio stream of a voice communication corresponding to a call into a plurality of blocks in response to the first voice communication device receiving the audio stream from a user of the first voice communication device. The first voice communication device modifies the plurality of blocks to generate a first modified audio stream corresponding to the call that includes hashed values of the plurality of blocks. The first voice communication device sends the first modified audio stream along with the hashed values of the plurality of blocks to a second voice communication device via a network. According to other illustrative embodiments, a computer system and computer program product for real time audio stream validation are provided.

DETAILED DESCRIPTION

Figure 1:
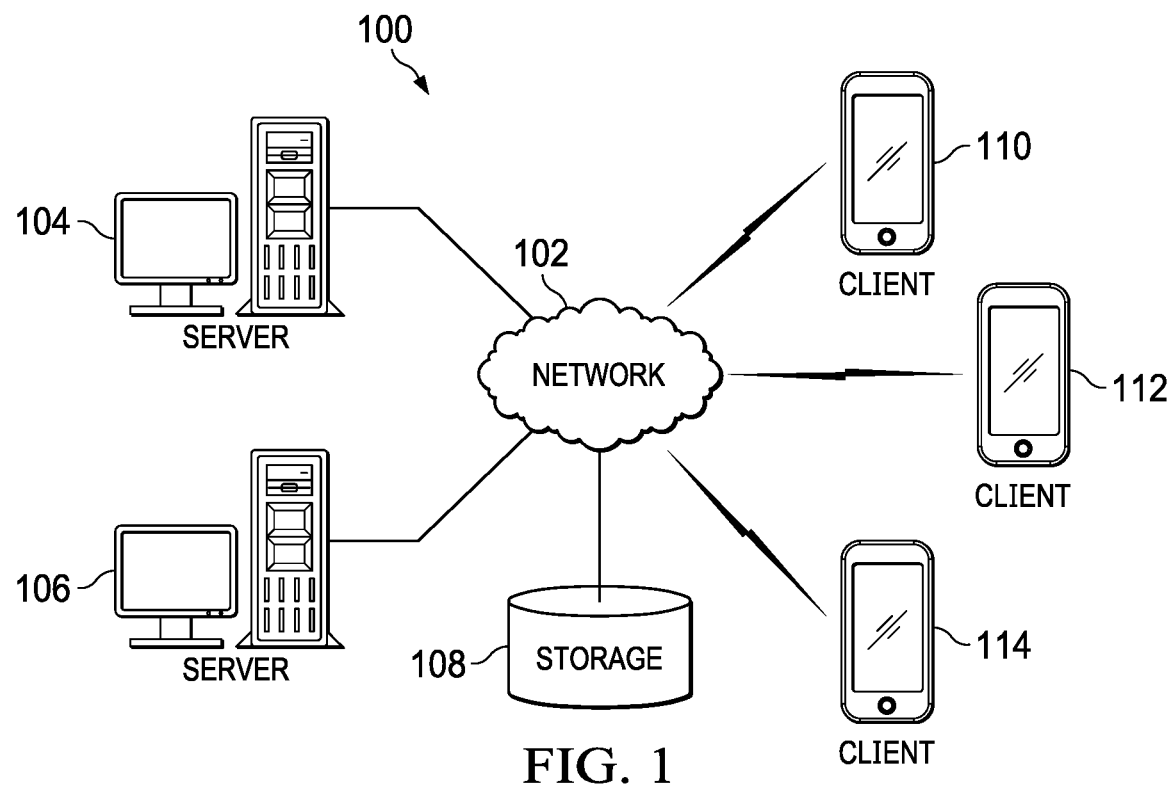
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
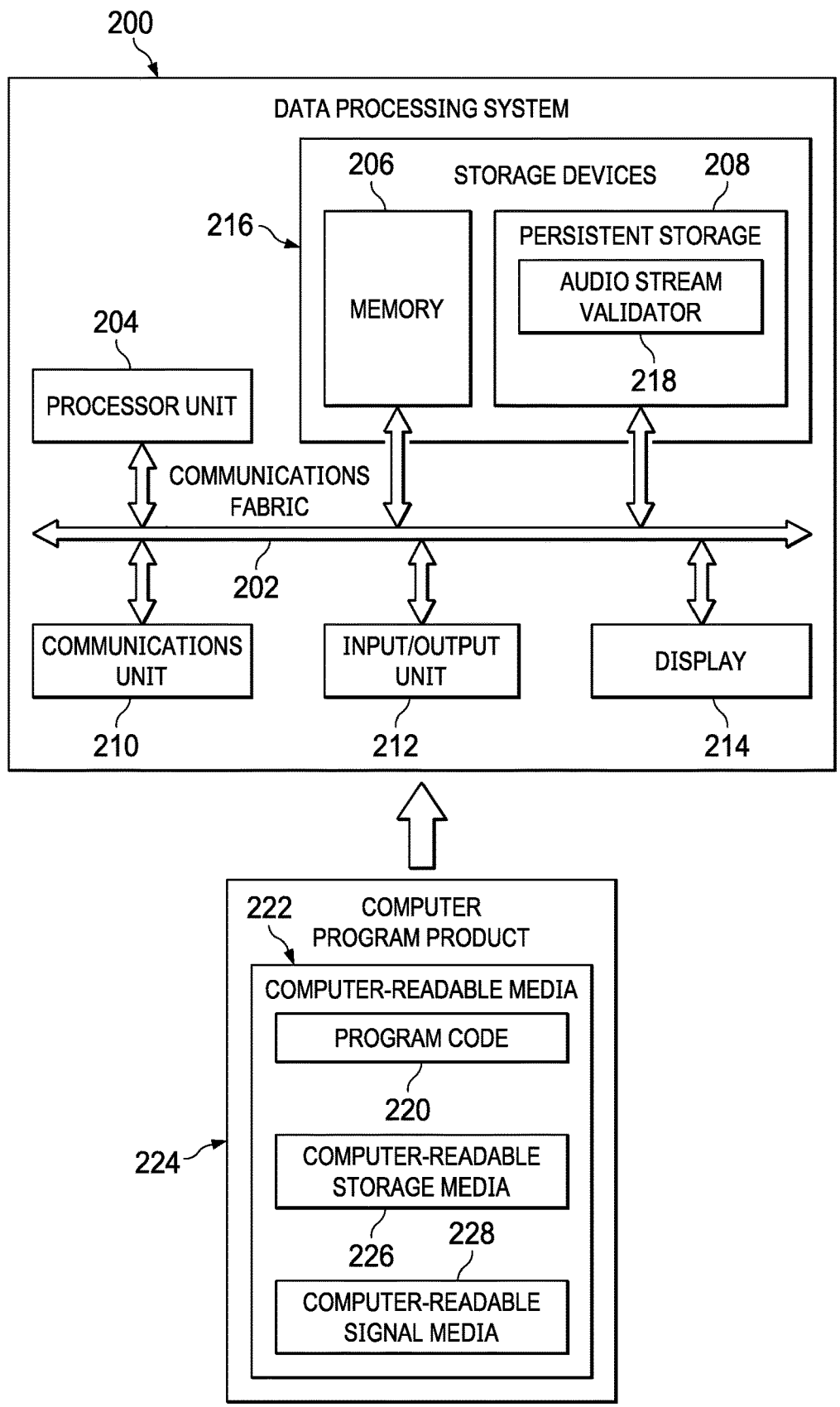
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. In this example, network data processing system 100 represents a telecommunications network. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments. In addition, server 104 and server 106 provide telecommunication services to client device users.

Client 110, client 112, and client 114 also connect to network 102. Clients 110, 112, and 114 are client devices of server 104 and server 106. In this example, clients 110, 112, and 114 are shown as mobile voice communication devices, such as, for example, smart phones, cellular phones, and the like, with wireless communication links to network 102. However, it should be noted that clients 110, 112, and 114 are examples only and may represent other types of voice communication systems, such as, for example, desktop or personal computers, laptop computers, handheld computers, smart televisions, smart vehicles, gaming systems, kiosks, and the like, with wire or wireless communication links to network 102. Users of clients 110, 112, and 114 may utilize clients 110, 112, and 114 to access and utilize the telecommunication services provided by server 104 and server 106 to participate in voice communications with other client device users.

Further, clients 110, 112, and 114 using illustrative embodiments are capable of validating that received audio streams of voice communications corresponding to calls are from trusted or legitimate sources (e.g., not scam calls) and have not been tampered with (e.g., unauthorized entities trying to join calls) by individually verifying hashed values of a series of blocks comprising the received audio streams.

If illustrative embodiments determine that all hashed values of audio stream blocks of a call are valid, then illustrative embodiments allow the call to continue as usual. However, if illustrative embodiments determine that a hashed value of an audio stream block is invalid, then illustrative embodiments alert a user of the client device via, for example, at least one of a virtual assistant voice alert, text notification, on-screen pop-up, or the like and terminate the call. Thus, illustrative embodiments increase security of voice communications.

Storage 108 is a network storage device capable of storing any type of data in a structured format or an unstructured format. In addition, storage 108 may represent a plurality of network storage devices. Further, storage 108 may store identifiers (e.g., telephone numbers, voice over internet protocol addresses, and the like) for a plurality of client devices, identifiers for a plurality of client device users, and the like. Furthermore, storage 108 may store other types of data, such as authentication or credential data that may include usernames, passwords, and the like associated with client device users, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, a telecommunications network, an internet, an intranet, a wide area network (WAN), a local area network (LAN), or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a voice communication device, such as client 110 in FIG. 1, in which computer-readable program code or instructions implementing the audio stream validation processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a storage device or a storage medium is any piece of hardware that is capable of storing information, such as, for example, without limitation, data, program code in functional form, and/or other suitable information either on a transient basis or a persistent basis. Further, a storage device or a storage medium excludes a propagation medium, such as transitory signals. Furthermore, a storage device or a storage medium may represent a set of storage devices or a set of storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, or a combination thereof.

In this example, persistent storage 208 stores audio stream validator 218. However, it should be noted that even though audio stream validator 218 is illustrated as residing in persistent storage 208, in an alternative illustrative embodiment, audio stream validator 218 may be a separate component of data processing system 200. For example, audio stream validator 218 may be a hardware component coupled to communication fabric 202 or a combination of hardware and software components.

Audio stream validator 218 controls the process of validating that an audio stream or a recording of the audio stream corresponding to a call is authentic and has not been tampered with by verifying a hashed value of each respective block in a series of blocks comprising the audio stream. As a result, data processing system 200 operates as a special purpose voice communication system in which audio stream validator 218 in data processing system 200 enables automatic audio stream validation for increased voice communication security. In particular, audio stream validator 218 transforms data processing system 200 into a special purpose voice communication system as compared to currently available general voice communication systems that do not have audio stream validator 218.

Communications unit 210, in this example, provides for communication with other computers, data processing systems, and devices via a network, such as network 102 in FIG. 1. Communications unit 210 may provide communications through the use of both physical and wireless communications links. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200. The physical communications link may utilize, for example, a wire, cable, universal serial bus, or any other physical technology to establish a physical communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the program instructions or program code are in a functional form on persistent storage 208. These program instructions may be loaded into memory 206 for running by processor unit 204. The program instructions, in the different embodiments, may be embodied on different physical storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Illustrative embodiments are capable of resolving issues regarding scam calls, caller identification (ID) spoofing, and other types of social engineering to manipulate people into divulging confidential information. For example, scam calls can fake caller ID information. Consequently, when receiving a call from a purported bank, it would be advantageous if the called device could display a notification or pop up to the user to confirm that the call is actually from a legitimate bank corresponding to that user. Similarly, when a purported account holder calls a bank to obtain account information or the like, the bank needs to authenticate the caller prior to releasing any sensitive information. It would be advantageous if a device of a legitimate caller could perform the authentication to the bank automatically and seamlessly for the caller. Currently, many applications exist that perform call verification based on phone numbers or caller ID, but these applications are easily spoofed. As a result, an improved call verification process is needed to confirm or verify that a given call comes from a trusted source.

Illustrative embodiments monitor a call in the background by verifying a hashed value of each respective block in a series of blocks comprising an audio stream of the call (e.g., conversation) to determine whether the call is from a trusted source. An audio stream delivers real time audio (e.g., voice communication) between devices via a network connection (e.g., telecommunications network). This continuous verification of the audio stream by illustrative embodiments can prevent different types of attacks, such as, for example, man-in-the-middle attacks, third-party intrusions, and the like, which generate noise affecting the hash of a block in the audio stream.

To perform this continuous verification of the audio stream, illustrative embodiments segment, divide, or chunk the audio stream into a plurality of blocks (e.g., a sequential series of blocks). Illustrative embodiments can generate blocks of the same length or of a variable length depending on implementation. In addition, each respective block of the audio stream includes a hash of the block that directly or immediately preceded that block. Illustrative embodiments send the current block with the hash of the previous block to a device receiving the audio stream. Illustrative embodiments integrate the hash as a high frequency signal inside the audio stream similar to audio steganography. Audio steganography is a technique used to transmit hidden information by modifying an audio stream in an imperceptible manner.

In other words, audio steganography is capable of hiding information in a host audio stream without interfering with the host audio stream. Alternatively, illustrative embodiments can send the hash as metadata via another telecommunications channel, such as, for example, evolved packet core or the like, to the device receiving the audio stream.

Illustrative embodiments calculate the hash of the first block in the audio stream and then add the hash of the first block to a second block of the audio stream. Illustrative embodiments then calculate a hash of the second block, which includes the hash of the first block, and add the hash of the second block to a third block of the audio stream, and so on. In this example, validation of the audio stream blocks is being performed on one side of the audio stream (e.g., the called device or the device receiving the audio stream). However, illustrative embodiment can perform the validation on both sides of the audio stream (e.g., on each device involved in the call). As a result, both participants of the call can know that they are communicating with a trusted or a legitimate person, device, entity, or the like.

Illustrative embodiments hash a block of the audio stream using a private cryptographic key corresponding to a user of a sending voice communication device (e.g., calling device). It should be noted that cryptographic keys are already shared or exchanged between the calling and called devices. Illustrative embodiments on the receiving voice communication device (e.g., called device) verify whether the received audio stream block was hashed with the correct private cryptographic key corresponding to the user of the sending voice communication device by utilizing a public key corresponding to the user of the sending voice communication device. As a result, illustrative embodiments enable continuous real time verification of the audio stream during the entirety of the call by individually analyzing each respective hashed audio stream block in the series of hashed audio stream blocks comprising the call.

Further, illustrative embodiments can detect the time when the audio stream becomes distorted or mingled by, for example, an unauthorized third party entering the call without permission. For example, illustrative embodiments can detect a minimal change in the audio stream, which may be caused by an intruder of the call, impacting the resultant hashed value of an audio stream block. As a result, illustrative embodiments can detect the invalid hashed audio stream block and provide an alert or warning to the user via a screen notification or pop up. Thus, illustrative embodiments are capable of detecting the time when the intrusion or man-in-the-middle attack occurred (e.g., when alteration in the hashed value of an audio stream block occurred). By using cryptographic keys, illustrative embodiments are capable of detecting the authenticity of the source or origin of a given audio stream.

As a result, illustrative embodiments resolve the issue of caller identification spoofing by correctly identifying legitimate calls. Thus, illustrative embodiments can protect against an attack in which a scam caller is wanting to obtain confidential information for later use (e.g., information misappropriation).

Furthermore, illustrative embodiments can be used to protect against copyright infringement when, for example, copyrightable material is transmitted during a call and a recorded copy of the call is available for verification by illustrative embodiments. Similarly, illustrative embodiments can be used for digital signature via voice in a recorded copy of a call. Moreover, illustrative embodiments can be used by additional applications for bidirectional authentication.

Thus, illustrative embodiments provide one or more technical solutions that overcome a technical problem with validating an audio stream of a voice communication corresponding to a call in real time to verify that the audio stream is from a trusted source and has not been tampered with. As a result, these one or more technical solutions provide a technical effect and practical application in the field of telephony security.

Figure 3:
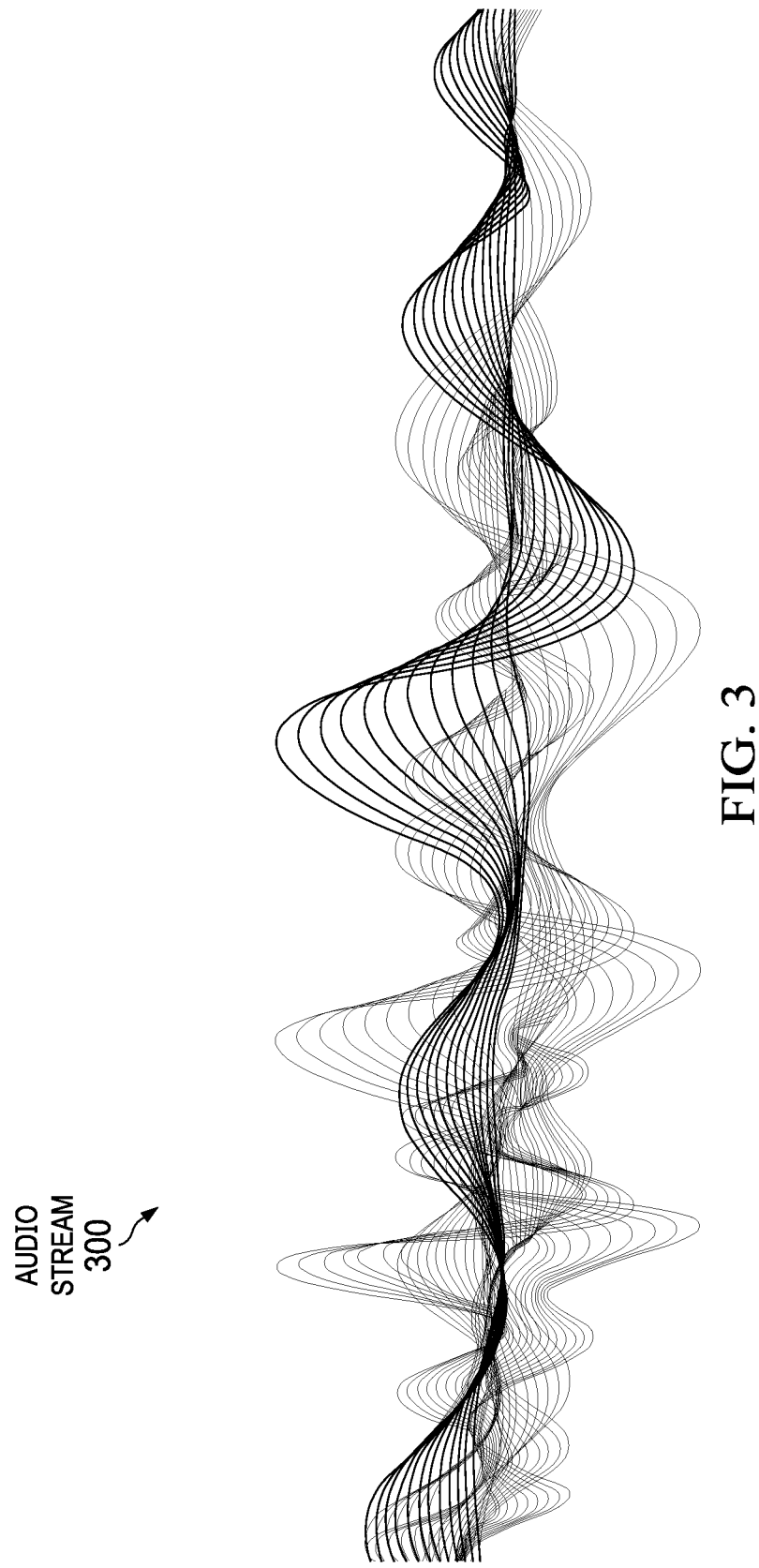
FIG. 3 is a diagram illustrating an example of an audio stream in accordance with an illustrative embodiment.

With reference now to FIG. 3, a diagram illustrating an example of an audio stream is depicted in accordance with an illustrative embodiment. Audio stream 300 may be implemented in a voice communication device, such as, for example, client 110 in FIG. 1 or data processing system 200 in FIG. 2.

In this example, audio stream 300 represents a voice communication (e.g., spoken words) corresponding to a call initiated by a user of the voice communication device with a user of another voice communication device. It should be noted that audio stream 300 is intended as an example only and not as a limitation on illustrative embodiments. In other words, illustrative embodiments may utilize any type of audio stream, audio track, voice spectrum, audio file, or the like.

Figure 4:
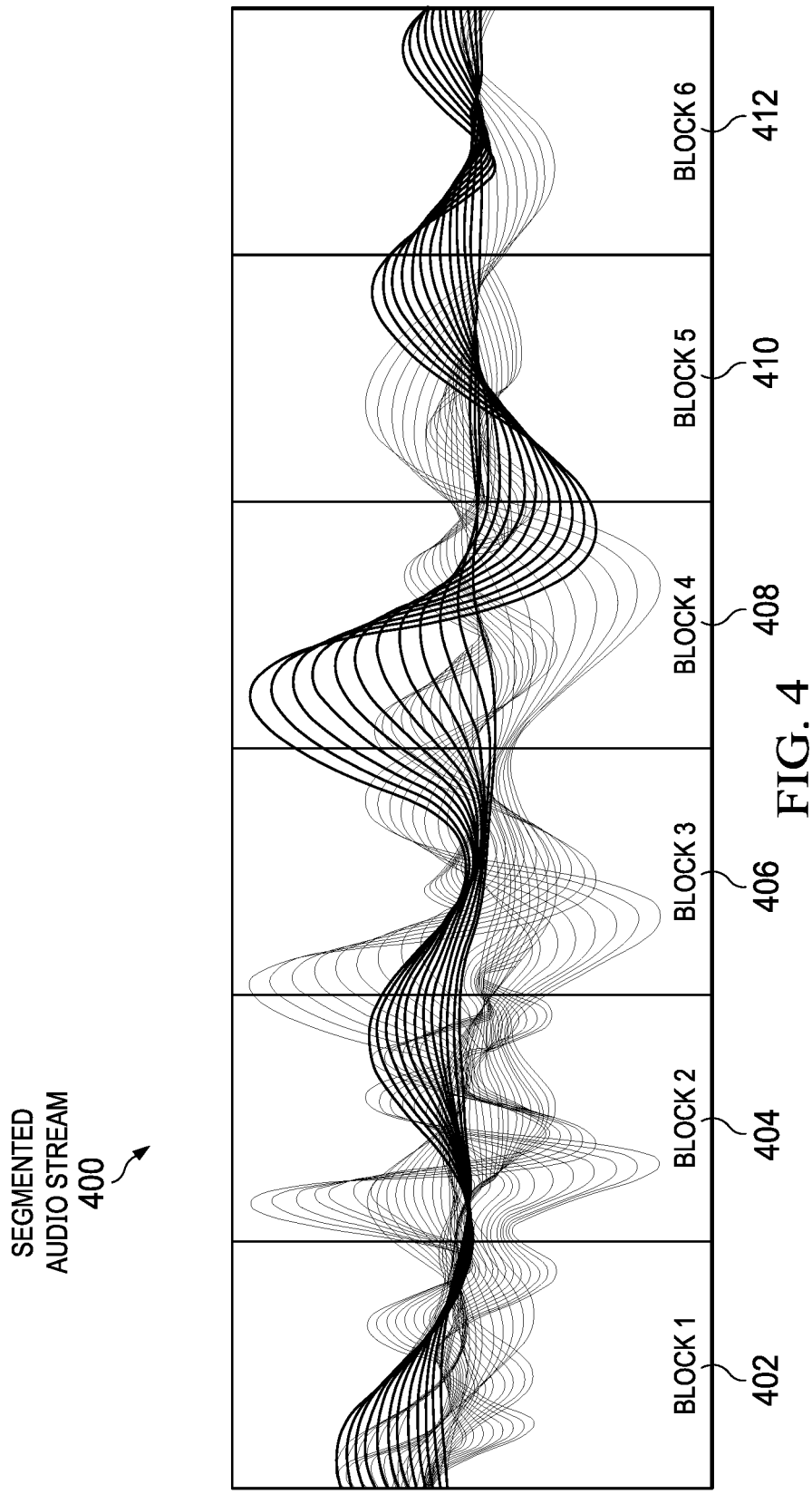
FIG. 4 is a diagram illustrating an example of a segmented audio stream in accordance with an illustrative embodiment.

With reference now to FIG. 4, a diagram illustrating an example of a segmented audio stream is depicted in accordance with an illustrative embodiment. Segmented audio stream 400 may be implemented in a voice communication device, such as, for example, client 110 in FIG. 1 or data processing system 200 in FIG. 2.

Segmented audio stream 400 represents an audio stream, such as, for example, audio stream 300 in FIG. 3, which is segmented by the voice communication device using, for example, an audio stream validator, such as audio stream validator 218 in FIG. 2. In this example, segmented audio stream 400 is comprised of block 1 402, block 2 404, block 3 406, block 4 408, block 5 410, and block 6 412. However, it should be noted that segmented audio stream 400 is intended as an example only and not as a limitation on illustrative embodiments. In other words, segmented audio stream 400 may include any number of blocks depending on the length of the audio stream corresponding to the call.

Figure 5:
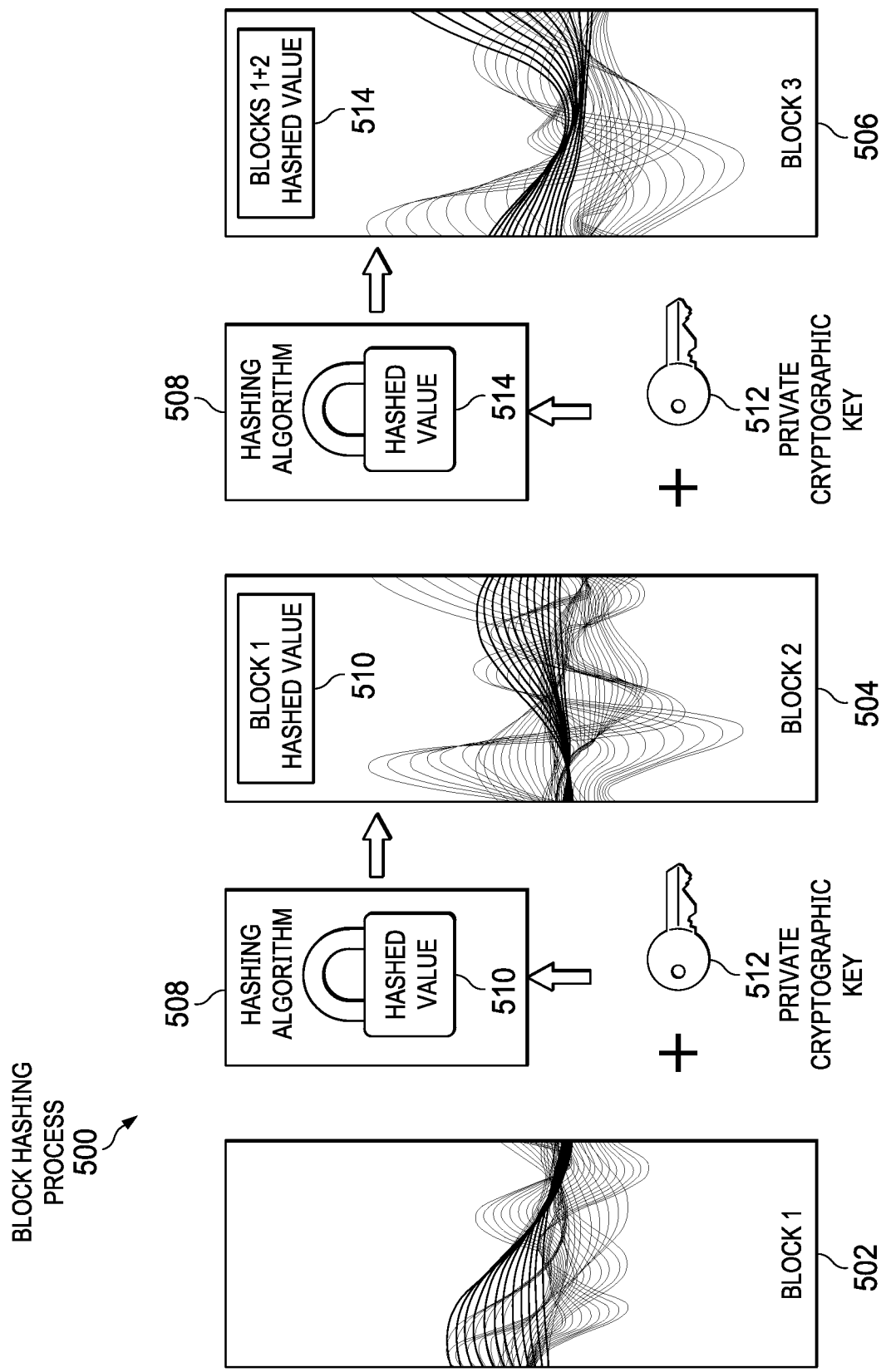
FIG. 5 is a diagram illustrating an example of a block hashing process in accordance with an illustrative embodiment.

With reference now to FIG. 5, a diagram illustrating an example of a block hashing process is depicted in accordance with an illustrative embodiment. Block hashing process 500 may be implemented in a voice communication device, such as, for example, client 110 in FIG. 1 or data processing system 200 in FIG. 2.

In this example, block hashing process 500 includes block 1 502, block 2 504, and block 3 506 of a segmented audio stream, such as, for example, block 1 402, block 2 404, and block 3 406 of segmented audio stream 400 in FIG. 4. Block hashing process 500 utilizes hashing algorithm 508 to generate hashed value 510 of block 1 502 based on private cryptographic key 512. Private cryptographic key 512 corresponds to a user of the voice communication device.

Block hashing process 500 adds hashed value 510 of block 1 502 to block 2 504. Then, block hashing process 500 again utilizes hashing algorithm 508 to generate hashed value 514 of block 2 504, which also now includes hashed value 510 of block 1 502, based on private cryptographic key 512. Block hashing process 500 then adds hashed value 514 of block 1 502 and block 2 504 to block 3 506. Block hashing process 500 continues to add a hashed value of a predecessor block, which includes a hashed value of its immediate predecessor, to a next or successor block until block hashing process 500 reaches an end of the segmented audio stream (e.g., end of the call).

Figure 6:
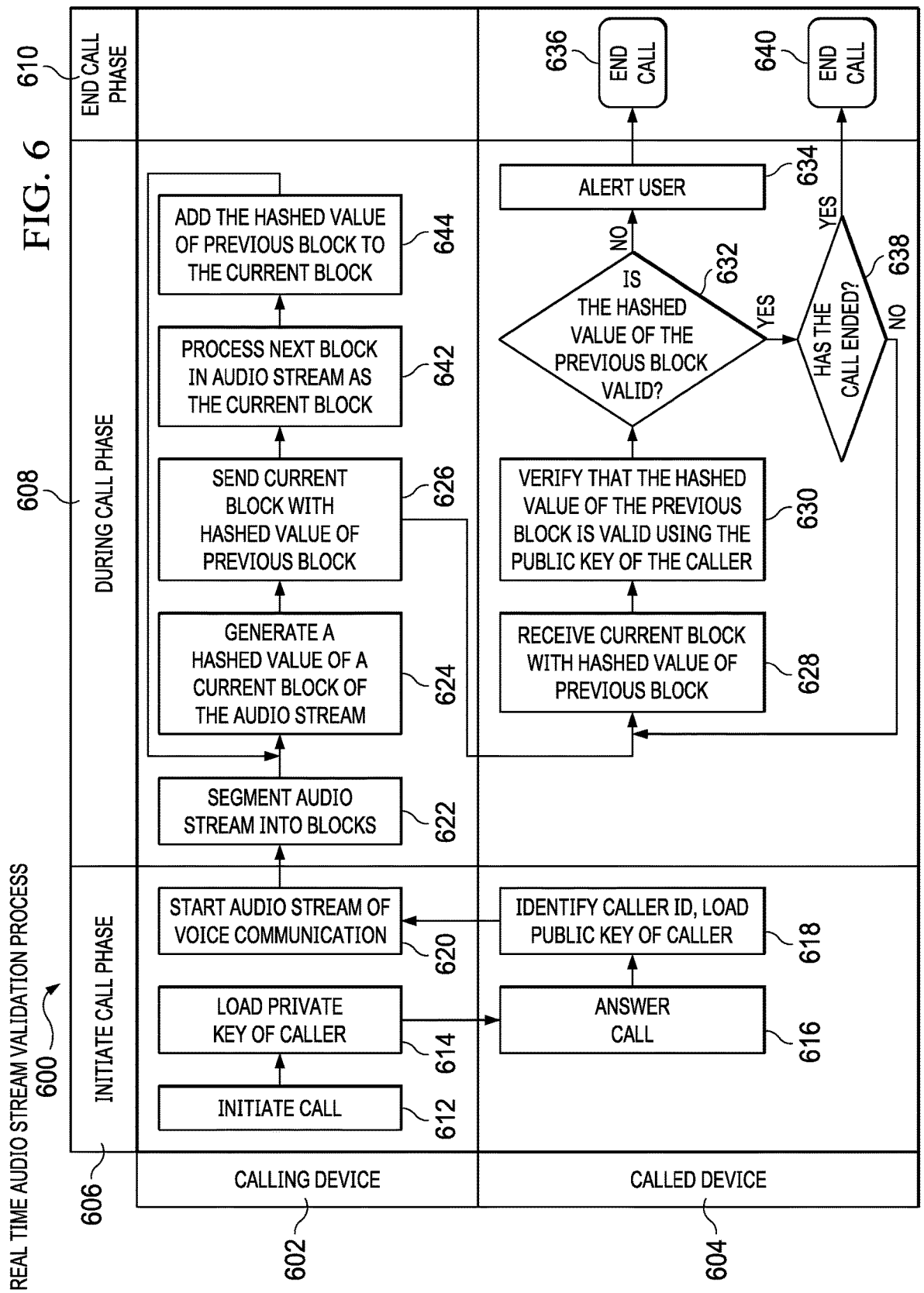
FIG. 6 is a diagram illustrating an example of a real time audio stream validation process in accordance with an illustrative embodiment.

With reference now to FIG. 6, a diagram illustrating an example of a real time audio stream validation process is depicted in accordance with an illustrative embodiment. Real time audio stream validation process 600 may be implemented in a network of data processing systems, such as, for example, network data processing system 100 in FIG. 1.

In this example, real time audio stream validation process 600 includes calling device 602 and called device 604. Calling device 602 and called device 604 may be, for example, client 110 and client 112 in FIG. 1, respectively. Calling device 602 is a first voice communication device sending an audio stream, such as, for example, audio stream 300 in FIG. 3, of a voice communication corresponding to a call. Called device 604 is a second voice communication device, which is to receive the audio stream of the voice communication corresponding to the call from calling device 602.

Also, real time audio stream validation process 600 includes initiate call phase 606, during call phase 608, and end call phase 610. Initiate call phase 606 represents when calling device 602 is connecting to called device 604 via a network, such as, for example, network 102 in FIG. 1. During call phase 608 represents when users of calling device 602 and called device 604 are engaged in voice communication (e.g., a spoken conversation). End call phase 610 represents when the network connection is terminated between calling device 602 and called device 604.

At 612, calling device 602 initiates the call to called device 604. At 614, calling device 602 loads a private cryptographic key corresponding to the user (i.e., caller) of calling device 602. The private cryptographic key corresponding to the user may be, for example, private cryptographic key 512 in FIG. 5. At 616, the user of called device 604 answers the call. At 618, called device 604 identifies the caller ID corresponding to calling device 602 and loads the public cryptographic key corresponding to the user of calling device 602. It should be noted that calling device 602 and called device 604 already exchanged private/public cryptographic key pairs.

At 620, calling device 602 starts to receive the audio stream of the voice communication from the user of calling device 602. At 622, calling device 602 segments the audio stream into a series of blocks to form a segmented audio stream, such as, for example, segmented audio stream 400 in FIG. 4. At 624, calling device 602 generates a hashed value of a current block of the audio stream, such as, for example, hashed value 510 of block 1 502 in FIG. 5. Calling device 602 generates the hashed value of the current block based on the loaded private cryptographic key corresponding to the user of calling device 602 using a hashing algorithm, such as, for example, hashing algorithm 508 in FIG. 5.

At 626, calling device 602 sends the current block of the audio stream of the voice communication corresponding to the call with a hashed value of a previous block to called device 604. Calling device 602 can send the hashed value of the previous block via, for example, a high frequency signal integrated within the audio stream. At 628, called device 604 receives the current block of the audio stream with the hashed value of the previous block from calling device 602 via the network. At 630, called device 604 verifies that the hashed value of the previous block is valid using the loaded public cryptographic key related to the private cryptographic key corresponding to the user of calling device 602.

At 632, called device 604 makes a determination as to whether the hashed value of the previous block is valid based on the verification at 630. If called device 604 determines that the hashed value of the previous block is invalid, then, at 634, called device 604 alerts the user of called device 604 regarding the invalid block of the audio stream via, for example, a screen notification or pop-up. In addition, at 636, called device 604 ends the call (e.g., terminates the network connection) with calling device 602.

However, if called device 604 determines that the hashed value of the previous block is valid, then, at 638, called device 604 makes a determination as to whether the call has ended. If called device 604 determines that the call has ended, then, at 640, called device 604 ends the call by terminating the network connection. If called device 604 determines that the call has not ended, then called device 604 continues to receive the audio stream with a hashed value of previous blocks.

Further, in addition to calling device 602 sending the current block of the audio stream with the hashed value of the previous block at 626, calling device 602, at 642, processes the next block in the audio stream as the current block. At 644, calling device 602 adds the hashed value of the previous or predecessor block to the current block. Then, real time audio stream validation process 600 goes from 644 back to step 624 where calling device 602 generates a hashed value of the current block, which now contains the hashed value of the previous block.

Figure 7:
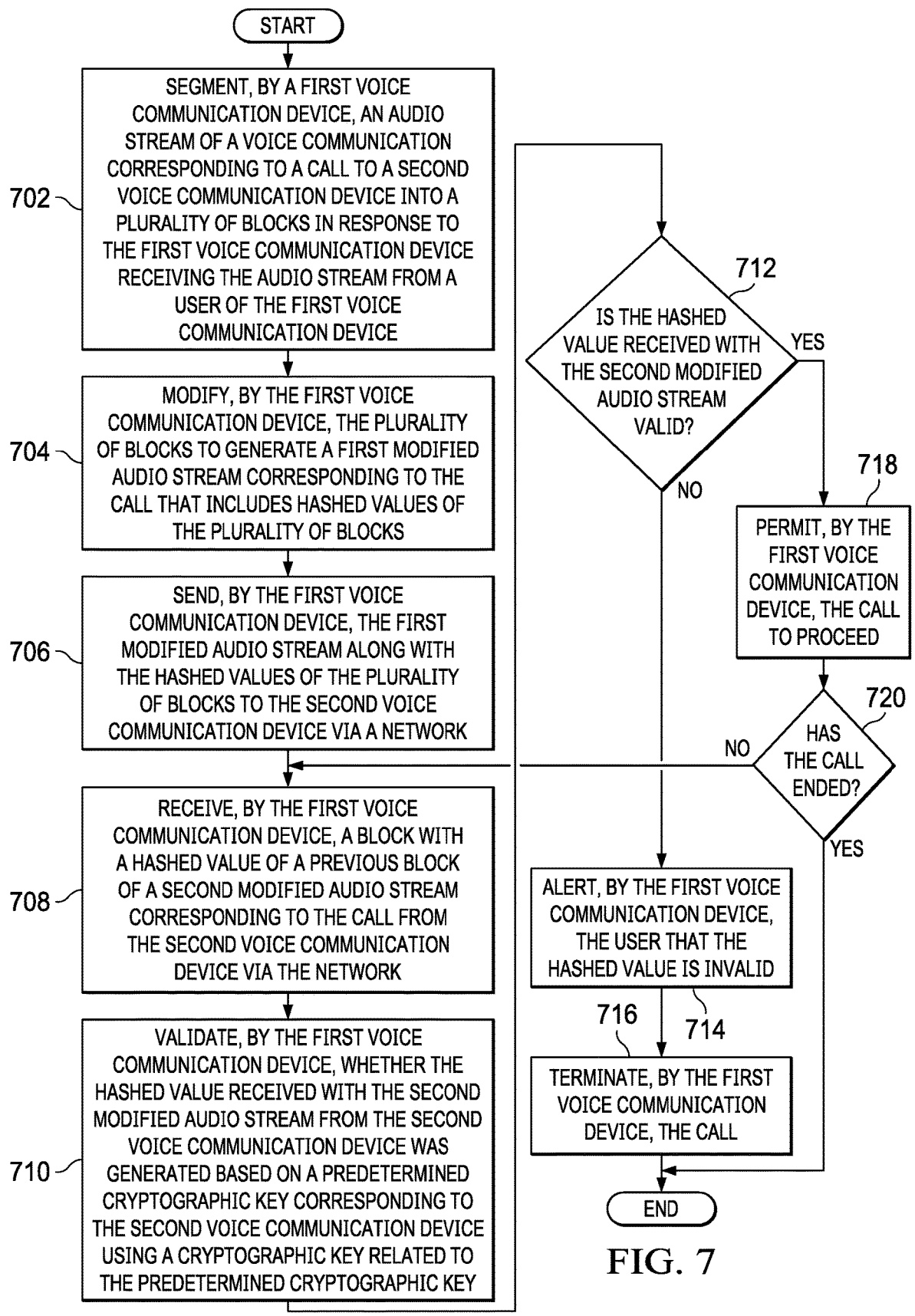
FIG. 7 is a flowchart illustrating a process for validating hashed audio stream blocks in real time in accordance with an illustrative embodiment.

With reference now to FIG. 7, a flowchart illustrating a process for validating hashed audio stream blocks in real time is shown in accordance with an illustrative embodiment. The process shown in FIG. 7 may be implemented in a first voice communication device, such as, for example, client 110 in FIG. 1 or data processing system 200 in FIG. 2. For example, the process shown in FIG. 7 may be implemented in audio stream validator 218 in FIG. 2.

The process begins when the first voice communication device segments an audio stream of a voice communication corresponding to a call to a second voice communication device into a plurality of blocks in response to the first voice communication device receiving the audio stream from a user of the first voice communication device (step 702). The second voice communication device may be, for example, client 112 in FIG. 1. The segmented audio stream may be, for example, segmented audio stream 400 in FIG. 4.

The first voice communication device modifies the plurality of blocks to generate a first modified audio stream corresponding to the call that includes hashed values of the plurality of blocks (step 704). It should be noted that the first voice communication device modifies the plurality of blocks to generate the first modified audio stream corresponding to the call by performing the process shown in FIG. 8. The first voice communication device sends the first modified audio stream along with the hashed values of the plurality of blocks to the second voice communication device via a network (step 706). The network may be, for example, network 102 in FIG. 1.

Subsequently, the first voice communication device receives a block with a hashed value of a previous block of a second modified audio stream corresponding to the call from the second voice communication device via the network (step 708). The first voice communication device validates whether the hashed value received with the second modified audio stream from the second voice communication device was generated based on a predetermined cryptographic key corresponding to the second voice communication device using a cryptographic key related to the predetermined cryptographic key (step 710). The predetermined cryptographic key may be, for example, a private cryptographic key of a private/public cryptographic key pair.

The cryptographic key related to the predetermined cryptographic key may be, for example, a public cryptographic key of the private/public cryptographic key pair.

The first voice communication device makes a determination as to whether the hashed value received with the second modified audio stream is valid based on the validation performed in step 710 (step 712). If the first voice communication device determines that the hashed value received with the second modified audio stream is not valid, no output of step 712, then the first voice communication device alerts the user that the hashed value is invalid (step 714). In addition, the first voice communication device terminates the call (step 716). Thereafter, the process terminates.

Returning again to step 712, if the first voice communication device determines that the hashed value received with the second modified audio stream is valid, yes output of step 712, then the first voice communication device permits the call to proceed (step 718). Further, the first voice communication device makes a determination as to whether the call ended (step 720). If the first voice communication device determines that the call has not ended, no output of step 720, then the process returns to step 708 where the first voice communication device waits to receive another block with a hashed value of previous blocks of the second modified audio stream. If the first voice communication device determines that the call has ended, yes output of step 720, then the process terminates thereafter.

Figure 8:
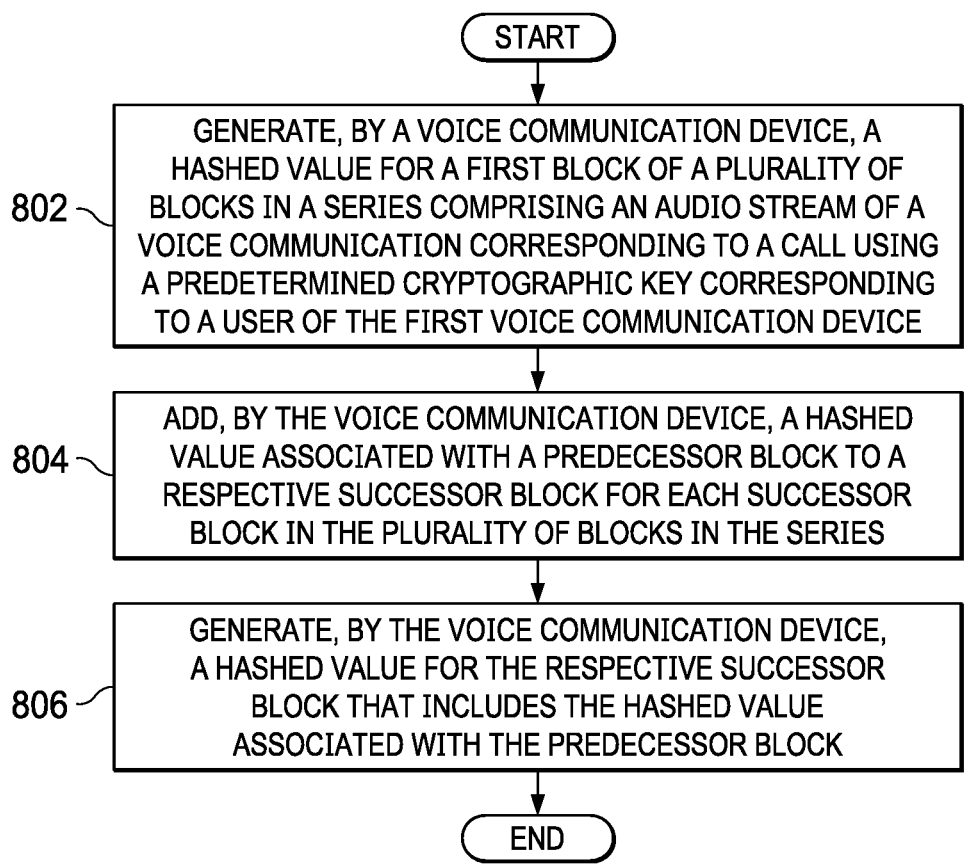
FIG. 8 is a flowchart illustrating a process for hashing blocks of an audio stream in accordance with an illustrative embodiment.

With reference now to FIG. 8, a flowchart illustrating a process for hashing blocks of an audio stream is shown in accordance with an illustrative embodiment. The process shown in FIG. 8 may be implemented in a voice communication device, such as, for example, client 110 in FIG. 1 or data processing system 200 in FIG. 2. For example, the process shown in FIG. 8 may be implemented in audio stream validator 218 in FIG. 2.

The process begins when the voice communication device generates a hashed value for a first block of a plurality of blocks in a series comprising an audio stream of a voice communication corresponding to a call using a predetermined cryptographic key corresponding to a user of the first communication device (step 802). The predetermined cryptographic key corresponding to the user may be, for example, a private cryptographic key of a private/public cryptographic key pair corresponding to the user. The voice communication device adds a hashed value associated with a predecessor block to a respective successor block for each successor block in the plurality of blocks in the series (step 804). The voice communication device generates a hashed value for the respective successor block that includes the hashed value associated with the predecessor block (step 806). Thereafter, the process terminates.

Thus, illustrative embodiments of the present invention provide a computer-implemented method, computer system, and computer program product for validating that an audio stream of a voice communication corresponding to a call is authentic from a trusted source and has not been tampered with by verifying a hashed value of each respective block in a series of blocks comprising the audio stream. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for real time audio stream validation, the method comprising:
    segmenting, by a first voice communication device, an audio stream of a voice communication corresponding to a call into a plurality of blocks in response to the first voice communication device receiving the audio stream from a user of the first voice communication device;
    modifying, by the first voice communication device, the plurality of blocks block by block to generate a first modified audio stream corresponding to the call that includes hashed values of the plurality of blocks;
    sending, by the first voice communication device, the first modified audio stream along with the hashed values of the plurality of blocks to a second voice communication device via a network, wherein the first modified audio stream is sent block by block as the plurality of blocks is modified;
    receiving, by the first voice communication device, a block with hashed value of a previous block of a second modified audio stream corresponding to the call from the second voice communication device via the network;
    validating, by the first voice communication device, whether the hashed value received with the second modified audio stream from the second voice communication device was generated based on a predetermined cryptographic key corresponding to the second voice communication device using a cryptographic key related to the predetermined cryptographic key; and
    determining, by the first voice communication device, whether the hashed value received with the second modified audio stream is valid based on the validating.

2. The method of claim 1 further comprising:
    permitting, by the first voice communication device, the call to proceed in response to the first voice communication device determining that the hashed value received with the second modified audio stream is valid.

3. The method of claim 1 further comprising:
    alerting, by the first voice communication device, the user that the hashed value is invalid and terminating, by the first voice communication device, the call in response to the first voice communication device determining that the hashed value received with the second modified audio stream is invalid.

4. The method of claim 3, wherein the first voice communication device performs the alerting by at least one of virtual assistant voice alert, text notification, or on-screen pop-up to the user.

5. The method of claim 1, wherein the first voice communication device modifies the plurality of blocks to generate the first modified audio stream corresponding to the call by:
    generating a hashed value for a first block of the plurality of blocks using a predetermined cryptographic key corresponding to the first voice communication device;
    adding a hashed value associated with a predecessor block to a respective successor block for each successor block in the plurality of blocks; and
    generating a hashed value for the respective successor block including the hashed value associated with the predecessor block.

6. The method of claim 1, wherein the sending, by the first voice communication device, of the first modified audio stream along with the hashed values of the plurality of blocks to the second voice communication device via the network further comprises:
sending, by the first voice communication device, the hashed values of the plurality of blocks via a high frequency signal integrated within the audio stream.

7. The method of claim 1, wherein the sending, by the first voice communication device, of the first modified audio stream along with the hashed values of the plurality of blocks to the second voice communication device via the network further comprises:
sending, by the first voice communication device, the hashed values of the plurality of blocks as metadata via another telecommunications channel.

8. The method of claim 1, wherein the first voice communication device is a calling device and the second voice communication device is called device.

9. A first voice communication system for real time audio stream validation, the first voice communication system comprising:
a bus system;
a storage device connected to the bus system, wherein the storage device stores program instructions; and
a processor connected to the bus system, wherein the processor executes the program instructions to:
segment an audio stream of a voice communication corresponding to a call into a plurality of blocks in response to the first voice communication system receiving the audio stream from a user of the first voice communication system;
modify the plurality of blocks block by block to generate a first modified audio stream corresponding to the call that includes hashed values of the plurality of blocks;
send the first modified audio stream along with the hashed values of the plurality of blocks to a second voice communication system via a network, wherein the first modified audio stream is sent block by block as the plurality of blocks is modified;
receive a block with a hashed value of a previous block of a second modified audio stream corresponding to the call from the second voice communication system via the network;
validate whether the hashed value received with the second modified audio stream from the second voice communication system was generated based on a predetermined cryptographic key corresponding to the second voice communication system using a cryptographic key related to the predetermined cryptographic key; and
determine whether the hashed value received with the second modified audio stream is valid based on validating.

10. The first voice communication system of claim 9, wherein the processor further executes the program instructions to:
permit the call to proceed in response to the first voice communication system determining that the hashed value received with the second modified audio stream is valid.

11. The first voice communication system of claim 9, wherein the processor further executes the program instructions to:
alert the user that the hashed value is invalid and terminate the call in response to the first voice communication system determining that the hashed value received with the second modified audio stream is invalid.

12. The first voice communication system of claim 11, wherein alerting of the user is performed by at least one of virtual assistant voice alert, text notification, or on-screen pop-up.

13. A computer program product for real time audio stream validation, the computer program product comprising a computer-readable storage medium having program instructions embodied therewith, the program instructions executable by a first voice communication device to cause the first voice communication device to perform a method of:
segmenting, by the first voice communication device, an audio stream of a voice communication corresponding to a call into a plurality of blocks in response to the first voice communication device receiving the audio stream from a user of the first voice communication device;
modifying, by the first voice communication device, the plurality of blocks block by block to generate a first modified audio stream corresponding to the call that includes hashed values of the plurality of blocks;
sending, by the first voice communication device, the first modified audio stream along with the hashed values of the plurality of blocks to a second voice communication device via a network, wherein the first modified audio stream is sent block by block as the plurality of blocks is modified;
receiving, by the first voice communication device, a block with a hashed value of a previous block of a second modified audio stream corresponding to the call from the second voice communication device via the network;
validating, by the first voice communication device, whether the hashed value received with the second modified audio stream from the second voice communication device was generated based on a predetermined cryptographic key corresponding to the second voice communication device using a cryptographic key related to the predetermined cryptographic key; and
determining, by the first voice communication device, whether the hashed value received with the second modified audio stream is valid based on the validating.

14. The computer program product of claim 13 further comprising:
permitting, by the first voice communication device, the call to proceed in response to the first voice communication device determining that the hashed value received with the second modified audio stream is valid.

15. The computer program product of claim 13 further comprising:
alerting, by the first voice communication device, the user that the hashed value is invalid and terminating, by the first voice communication device, the call in response to the first voice communication device determining that the hashed value received with the second modified audio stream is invalid.

16. The computer program product of claim 15, wherein the first voice communication device performs the alerting by at least one of virtual assistant voice alert, text notification, or on-screen pop-up to the user.

17. The computer program product of claim 13, wherein the first voice communication device modifies the plurality of blocks to generate the first modified audio stream corresponding to the call by:

generating a hashed value for a first block of the plurality of blocks using a predetermined cryptographic key corresponding to the first voice communication device;

adding a hashed value associated with a predecessor block to a respective successor block for each successor block in the plurality of blocks; and generating a hashed value for the respective successor block including the hashed value associated with the predecessor block.

\* \* \* \* \*